United States Patent [19]

Preissler

[11] Patent Number: 4,918,694
[45] Date of Patent: Apr. 17, 1990

[54] METHOD AND APPARATUS FOR CORRECTION OF ERRORS IN DIGITAL AUDIO DATA

[75] Inventor: Hannfried Preissler, Darmstadt, Fed. Rep. of Germany

[73] Assignee: Robert Bosch GmbH, Stuttgart, Fed. Rep. of Germany

[21] Appl. No.: 202,192

[22] Filed: Jun. 2, 1988

[30] Foreign Application Priority Data

Jun. 11, 1987 [DE] Fed. Rep. of Germany ....... 3719406

[51] Int. Cl.⁴ ............................................. G06F 11/10
[52] U.S. Cl. .................................. 371/37.4; 371/68.1
[58] Field of Search ...................... 371/37, 38, 39, 40, 371/68, 69, 70, 37.4, 40.1, 68.1

[56] References Cited

U.S. PATENT DOCUMENTS

| | | | |
|---|---|---|---|
| 3,703,706 | 11/1972 | Ogura et al. | 371/69 |
| 4,200,838 | 4/1980 | Poitevin | 371/69 |
| 4,653,051 | 3/1987 | Sugimura et al. | 371/37 |
| 4,742,519 | 5/1988 | Abe et al. | 371/38 |
| 4,799,113 | 1/1989 | Murakami | 371/38 |

Primary Examiner—Charles E. Atkinson
Attorney, Agent, or Firm—Frishauf, Holtz, Goodman & Woodward

[57] ABSTRACT

In a system for correction of digital audio data, read out from a magnetic tape in code blocks each containing a number of data words together with first check words and a number of code blocks together form a data field for the columns of which second check words are formed and recorded and wherein audio data are recorded in first and second recordings of each code block, the data read out from the tape are first provided with corrections and error flags for the presence of uncorrectable words by means of the first check words and thereafter the data words are subject to selection of the largest number of error free code blocks from the first and second recordings for submission to error correction with reference to the data field second check words.

9 Claims, 3 Drawing Sheets

METHOD AND APPARATUS FOR CORRECTION OF ERRORS IN DIGITAL AUDIO DATA

CROSS REFERENCE TO PENDING APPLICATION ON RELATED SUBJECT MATTER:

Application of Jurgen Heitmann, Rolf Loos and Roland Mester for a Method and Apparatus for Reproducing Video Data Stored on a Magnetic Tape in a Manner Facilitating Search Slow Motion Operation, Ser. No. 07/193,903, filed May 13, 1988.

This invention concerns the detection and correcting of errors in digital audio data read out from a magnetic tape. More particularly it relates to digital audio data which has been recorded from the tape in accordance with a modern standard according to which code blocks are formed, each from a plurality of data words and a first check word, which code blocks are processed for error protection and, if possible, correction by reference to that first check words. Such audio data also includes second check words for use when audio data words are arrayed into data fields composed of rows of equal numbers of data words followed by an interface control word, for which field each defined column has a plurality of second check words arrayed in respective check word rows. The audio data are usually present in first and second recordings, except in certain interposed portions of data.

The so called D1 standard for digital video recording envisages four channel digital audio recording as well as four channel digital video recording. Under this standard the digital sample values of each of the sound channels are twice recorded in four sectors in each of a number of segments. Each segment contains the information of four sound channels. In order to be able to correct errors arising in reproduction, check words are added in the recording of the data words. A double protection against error is used which consists in that a row of data words that form a code block is supplied with first check words and in that a number of these code blocks produce a data field composed of several rows of an equal number of data word blocks and several rows of second check words, so that for each defined column the data field has a plurality of second check words.

The formation of check words both for the first and second check words is performed in accordance with the Reed Solomon code. This system of first check words in code blocks and second check words for data field columns is known in the technical literature as providing "inner" and "outer" encoding and decoding.

The protection against errors is extended by duplicate recording of each sound channel.

In reproduction there is first performed error recognition and correction within the code blocks (inner decoding). For correctable data words found to be erroneous, correction is carried out. If more than one data word in a code block is erroneous it can only be recognized that there are erroneous data words present. In cases of plural errors the entire code block is declared erroneous when the data is put into a following buffer memory and an error flag relating thereto is also written in. In the further correction of errors by means of a so called outer decoder, for every four bits of a code block an error correction syndrome is formed by columns of the data fields (and hence in a direction in the field perpendicular to the direction in which the code blocks extend in the field). In so far as an error flag is provided by the inner decoder, the outer decoder is in a position to correct up to three erroneous code blocks. If more than three code blocks are designated erroneous, no correction can result. In that case the effects of the errors can be reduced only by a later interpolation procedure. Furthermore the outer decoder does not have the capability of recognizing errors. As a result audio data with a false error identification or with unrecognized errors have unusually disturbing effects when they get through this kind of a correction process. Further details of the D1 standard are described in the publications "Standard for Recording Digital Television Signals on Magnetic Tape in Cassettes" of the European Broadcasting Union, Tech 3252-E, the "Proposed American National Standard for Digital Videorecording" of the Society of Motion Picture and Television Engineers (SMPTE) 224M–228M and the periodical Fernseh-und Kinotechnik 987, Heft ½, pages 15–22.

SUMMARY OF THE INVENTION

It is an object of the present invention to improve correction of errors in digital audio data which are read out from a magnetic tape, particularly from a magnetic tape on whch television has been recorded.

Briefly, error recognition and, so far as possible, error correction are performed by reference to the first check words, then duplicate transmission of the same audio data, together with any error flags made simultaneously available, are used for filtering out error free data and, thereafter, further corrections are made by reference to second check words by an evaluation of data fields. Data words are selected between corresponding data words of the first and second recording in a manner that will maximize the number of error free data words.

The method and apparatus of the invention have the advantage that correction is still possible for a number of errors in a code block so great that further corrections are no longer possible by the methods heretofore known. There is the further advantage that the availability of the first and second recordings of the same data words is made use of in accordance with the present invention in a particularly efficient way.

Further features of the invention will be better appreciated in connection with a detailed description given further below.

BRIEF DESCRIPTION OF THE DRAWINGS

The invention is further described by way of illustrative example with reference to the annexed drawings, in which:

FIG. 1 is a tabular representation of the processing of error corrections, particularly in the outer decoder.

DESCRIPTION OF THE ILLUSTRATED EMBODIMENT

Figure 1:
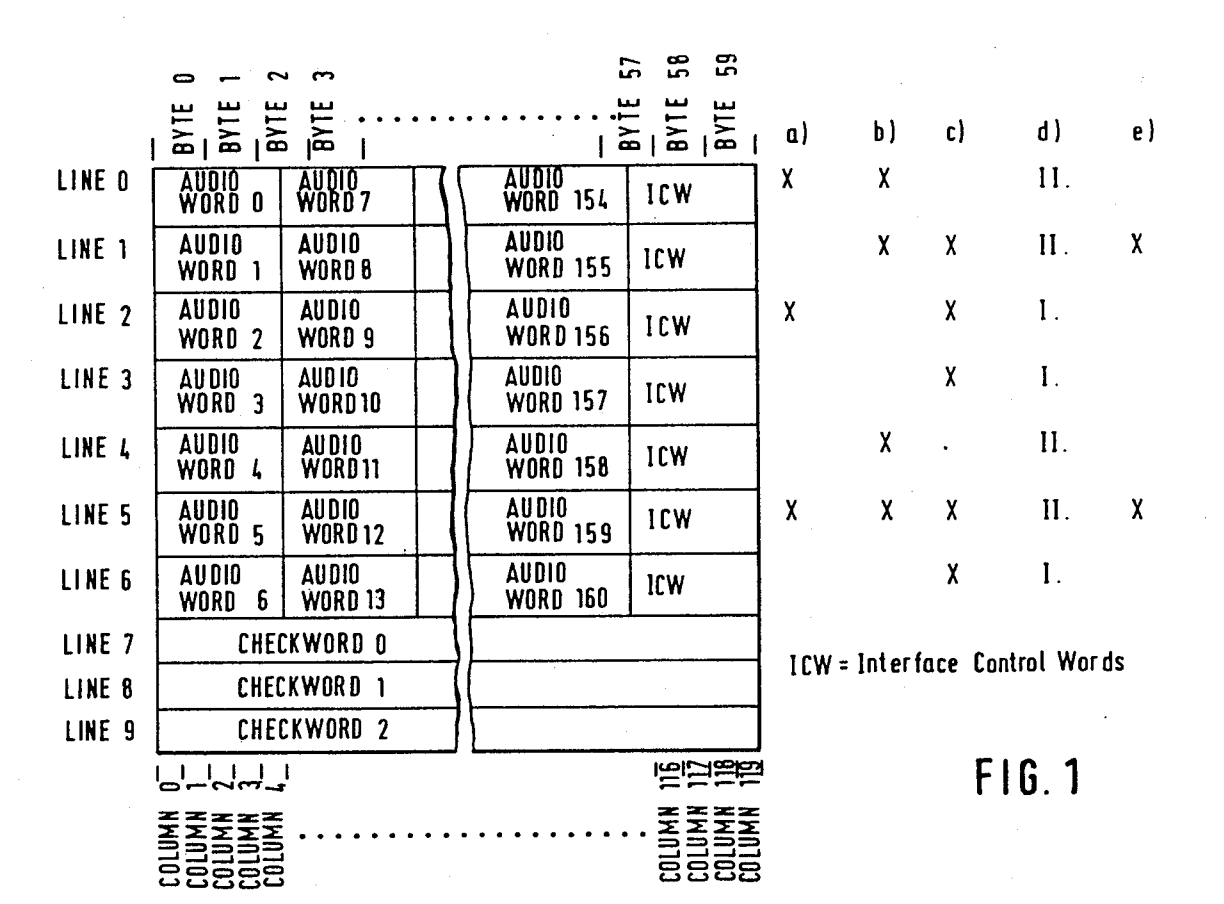

The audio data field shown in FIG. 1 is composed of a number of lines each 60 bytes long (bytes 0, 1 ... 59). Seven of these lines (lines 0, 1 ... 6) contain audio words each occupying two and one-half bytes and three other lines (lines 7, 8 and 9) contain 8-bit check words.

The 20-bit audio words each represent a sample value of the audio signal. For facilitation of error concealment the sample values are shuffled, so that sample values that are successively occurring do not appear successively in a code block.

At the end of each line is a 20-bit interface control word (ICW). In such a word, for example, it will be designated whether an edit point, preferably referred to as an interface, is located at the end of the line. 23 audio words and one interface control word make up one code block and occupy one line of the field shown in FIG. 1.

The columns of the data field illustrated in FIG. 1 are each made up of four bits from each line. There are three 8 bit check words for each column respectively provided in lines 7, 8 and 9.

If for example, more than one error is present in lines 0, 2 and 5 after read-out from the magnetic tape, these code blocks cannot be corrected by the inner decoder. In the first error correction stage, therefore, the inner decoder provides these code blocks with error flags EF (see column a) at the right of the FIG. 1 data field) and are passed on to the outer decoder. By reference to the information from the error flags and of the check words, the correction can be carried out in the outer decoder. In columns (b) and (c) examples of error flags respectively for a first and second (I and II) recording of the same data are shown. In each case at least four of the code blocks are designated as erroneous. Correction by the outer decoder in such case is simply not possible.

In column (b) to the right of the data field of FIG. 1 it is shown which of the recordings are used in accordance with the method of the invention for further error correction by the outer decoder. From column (e) to the right of column (d) it can be seen that by the use of the method of the invention just two more erroneous code blocks can be supplied to the outer decoder and fully corrected.

Figure 2:
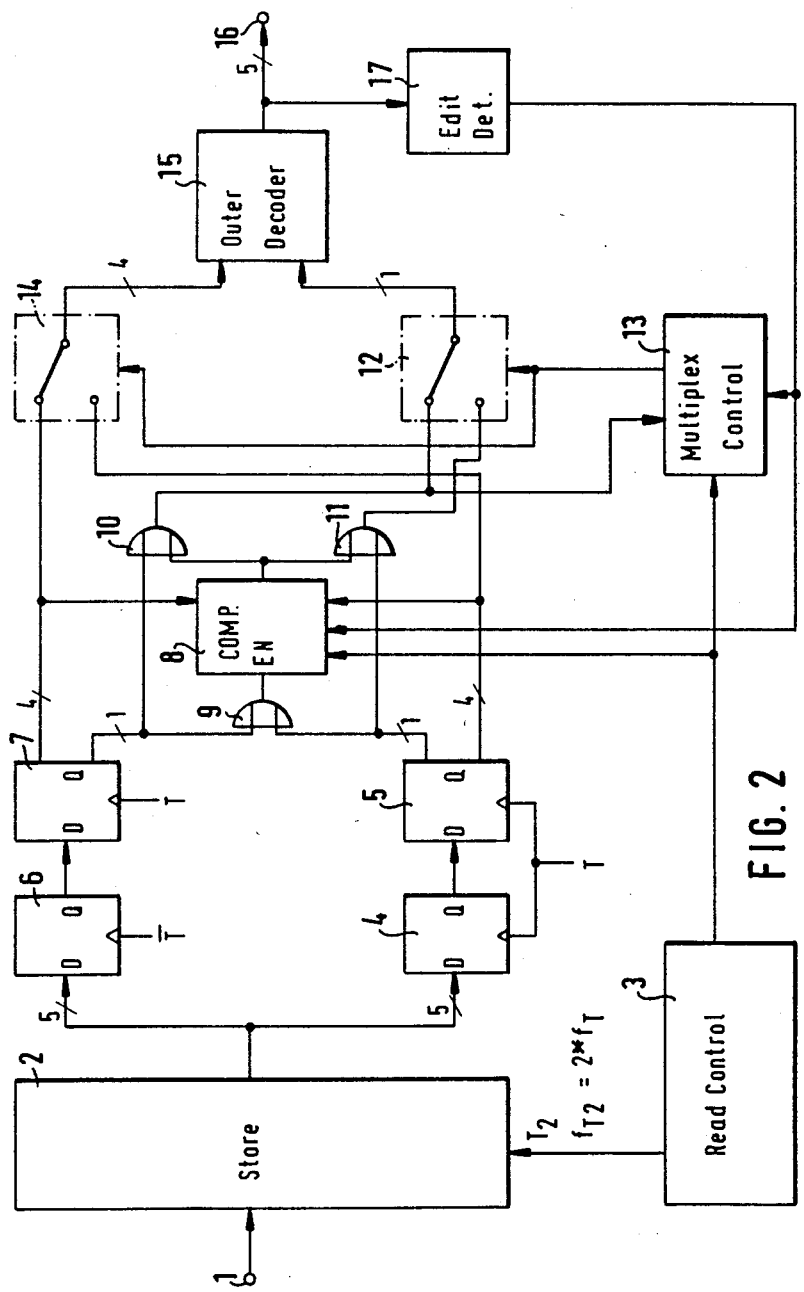
FIG. 2 is a block circuit diagram of apparatus for carrying out the method of the invention.

The audio data supplied at the terminal 1 to the circuit of FIG. 2 have already been processed by the inner decoder. Whenever they have been recognized by the inner decoder as uncorrectable by it, they have been supplied with an error flag. The audio data are then put into a buffer memory 2 which is referred to in the above mentioned publications as a deshuffling store. Thereafter, these data are read out under the control of a read-out control circuit 3. In this read out operation there are read out in time multiplex, at one time, four bits of audio data and one error flag bit of the first recording of the data and four bits of audio data and one error flag bit of the second recording. The first-mentioned five bits go to the register 6, 7 and the second mentioned five bits go to the register 4, 5. These registers are each shown as a combination of two D flipflops. With suitable clocking by the control circuit 3 delays are provided such that all ten bits are simultaneously available from the combination of registers 5 and 7. The two 4-bit parallel audio data portions are supplied to a comparison circuit 8 which, however, is only active (enabled) if neither of the audio data portions is accompanied by a set error flag EF. For control purposes the error flags are supplied to an OR-gate 9, the output of which supplied in the proper logic polarity to a control input EN of the comparison circuit 8.

The error flags EF as well as the output signal of the comparison circuit 8 are supplied to two OR-gates 10, 11 which together provide a logic circuit. Each provides an output to one of the selectable contacts of the multiplex switch 12. In addition, the output of the OR-gate 10 is connected with a control input of a multiplex control circuit 13. The multiplex control circuit 13 is supplied with an edit flag from time to time by the read-out control circuit 3. The edit flag is set at the beginning of a segment of a particular audio channel (the succession of audio channels is illustrated in the top line of FIG. 3). Especially on account of designation of interfaces, a separate processinng of the respective interface control words of the first and second recordings is necessary. For this reason a signal is then provided to the multiplex control circuit 13 from the read-out control circuit 3 that provides "optimization" for the interface control words in accordance with the invention.

The multiplex control circuit 13, in addition to controlling the multiplexer 12 also similarly controls the multiplexer 14 which provides to the outer decoder 15, for further error correction, either the audio data of the first recording or the audio data of the second recording, according to the multiplexer position. The outer decoder delivers the corrected audio data to the terminal 16 which also forms the input for further processing the corrected audio data. The output of the outer detector 15 is also connected with a circuit 17 which recognizes whether the interface control word of the first code block of a data field designates that an interface is present. In dependence thereon the circuit 17 controls the multiplex control circuit 13 and the comparison circuit 8.

The function of the system shown in FIG. 2 will now be explained in a case where no interface is present.

The reading out of the audio data from the buffer memory 2 takes place at twice the usual clock frequency of the system, so that during one normal clock period of the clock rhythm for further processing there are read out from the memory first the data of the first recording and then the data of the second recording. As already mentioned, these data are made available in parallel at the outputs of the registers 5 and 7. The comparison circuit 8 checks the identity of the data of the first and second recording, to determine whether both of them are error free. If the data are not identical, an error flag is produced by the output of the OR-gates 10, 11. If, however, the data are already accompanied in at least one of the recordings with an error flag, the OR-gate 9 deactivates the comparison circuit 8.

The multiplex control circuit 13 checks the error flag content of the first recording. If an error flag is set, the corresponding data word of the second recording is supplied to the outer decoder 15. If no error flag is set for the first recording, the first recording goes to the outer decoder 15. It is thus obtained that error free data are supplied to the outer decoder so that recognizable error free data can be obtained when available from the recordings. Whereas in the known methods of operation the outer decoder is overloaded when more than three erroneous code blocks per data field are found, it is possible by the method of the present invention to carry out still one more correction if up to three identical code blocks in the first and second recording are affected by errors and the total count of erroneous code blocks per data field is greater 3. The overloading of the outer decoder occurs only when four identical code blocks in both recordings are erroneous.

At an interface the data of the first and second recordings within one segment are different. They may not, accordingly, be interchanged in the sense of the method of the present invention. For this reason the system of FIG. 2 provides for switching out the multiplex control circuit 13 and the comparison circuit 8 at an interface so that further error correction by means of the outer decoder operates first for the audio data of the first recording and thereafter for the audio data of the second recording, in every case for a data field.

Figure 3:
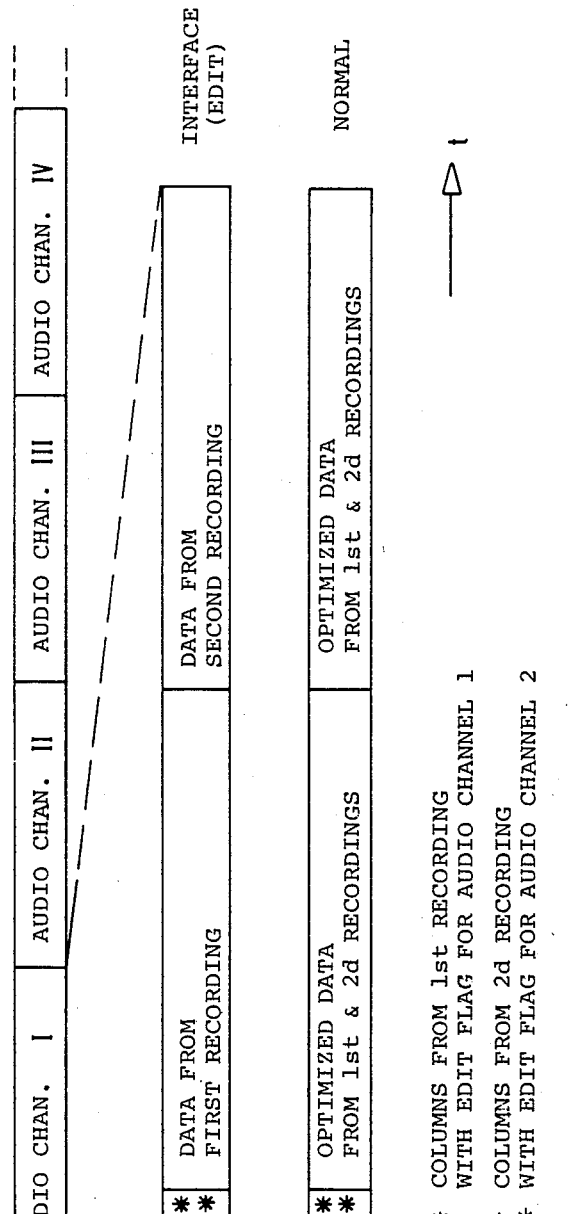
FIG. 3 is a timing diagram showing at the top the tramsmission of a sequence of audio channels and, in the remainder of the figure, on an enlarged time scale, the processing of audio channel I.

FIG. 3 shows in a simplified way the time course of the method of the invention. In the top line (a) are shown the time intervals for the audio channels I to IV. The method of the invention can be utilized for each of the audio channels independently of the other audio channels. In the presentation according to FIG. 3 only error correction according the the invention for audio channel 1 is schematically shown. In the line shown in the middle of FIG. 3 the time course for an interface is shown, where the data of the first recording are first corrected and thereafter the data of the second recording. The normal processing is shown in the bottom line of FIG. 3 where data are similarly corrected twice in succession and where according to the method of the invention corrections are obtained both from the first recording and from the second recording. This takes place in reproduction when there is no cut or separation location (i.e. where both recordings are of the same data).

FIG. 3 also shows that the data are in each case preceded by edit flag data for the first recording and for the second recording.

I claim:

1. Method of correcting digital audio data read out from a magnetic tape, wherein code blocks are formed each from a plurality of data words together with a first check word and wherein a defined multiplicity of said code blocks form a data field composed of several rows of an equal number of data word blocks followed by an interface control word, for which field each defined column has a plurality of second check words arrayed in respective check word rows, and wherein said audio data is present in a first and a second recording and wherein, further, the following combination of method steps is performed:

error recognitions and, so far as possible, error corrections are performed by reference to said first check words;

thereafter data words are selected between corresponding data words of said first and second recording to maximize the number of error free data words; and by reference to said second check words error corrections are thereafter made.

2. Method according to claim 1, wherein after error recognition and correction by reference to said first check words has been performed, audio data of said first and second recording are compared with each other whenever the audio data of said first and said second recording are designated as error free by reference to said first check words and when said comparison fails to show identity of said audio data of said first and second recording, said audio data both of said first and second recording are designated erroneous.

3. Method according to claim 1, wherein for said error corrections by reference to said second words, data fields are formed which contain, so far as possible, the error free code blocks of said first and second recordings of said audio data.

4. Method according to claim 3, wherein as a result of said error recognition and correction by reference to said first check words, the audio data and error flags related thereto are written into a buffer memory and corresponding data of said first and second recording are read out of said buffer memory in parallel.

5. Method according to claim 3, wherein the following error recognition and correction with reference to said first check words said audio data and related error flags are written into a buffer memory and corresponding data of said first and second recording are read out from said buffer memory while with suitable clocking and delay are provided for making said corresponding data simultaneously available.

6. Method according to claim 1, wherein said audio data contains interposed portions of data in which the content of said first and second recordings are different and during the presence of said interposed portions the step of error recognition and correction by reference to said second check words proceeds sequentially for said first and second recordings.

7. Method according to claim 6, wherein a signal is derived which is dependent upon the presence of the said interposed portion of audio data, which signal is derived from audio data which has already been corrected by reference to said second check words.

8. Apparatus for correcting digital audio data read out from a magnetic tape in the form of sequences of code blocks respectively accompanied by first check words and followed in the case of each said sequence by a sequence of second check words produced by encoding following the temporary arraying of a said sequence of code blocks into a data field, said audio data being subject to duplicate recording except for interposed transitional portions of recording, said duplicate recording comprising a first recording of said audio data code blocks including check words and a second recording of the same audio data code blocks including the same check words, said apparatus including apparatus for recognition and correction of errors with reference to said first check words and setting of error flags for uncorrectable errors, said apparatus further comprising:

buffer memory means (2, 4 . . . 7) having read out means for reading out corresponding portions of said first and second recordings in parallel;

comparing means (8) connected to the output of said buffer memory for comparing said first and second recording portions read out in parallel;

first and second multiplexers (14, 12);

logic circuit means connect (10, 11) connected to the output of said comparing means and connected to the error flag outputs of said buffer memory for said first and second recordings for control of said first and second multiplexers (14, 12), said first multiplexer 814) being connected to said buffer memory (2, 4 . . . 7) for receiving said portions of said first and second recording and said second multiplexer (12) being connected to the output of said logic circuit means (10, 11) for receiving error flags processed by said logic circuit, and means (15) connected to the outputs of said first and second multiplexers for arraying said code block sequences and corresponding second check words in data fields and for correcting errors in said audio data by reference to said second check words.

9. Apparatus according to claim 8, wherein there are provided a control logic circuit (13) and an edit detector (17) for detecting said interposed transitional portions of recording, said edit detector having an input connected to the output of said means for error correction by reference to said second check words and having an output connected to said multiplexer control means (13) and to said comparison means (8), said multiplex control means having an input for coordination with the read out control of said buffer memory and a further input connected to said logic circuit means (10, 11) and serving for controlling said first and second multiplexers to supply to said means for correction of errors with reference to said second check words with audio data and error flags either from said first recording of audio data code blocks or from said second recording of audio data code blocks.

* * * * *